(12) United States Patent
Evans et al.

(10) Patent No.: US 10,663,937 B2
(45) Date of Patent: May 26, 2020

(54) ADJUSTING VOLTAGE SETTINGS BASED ON ELECTRICAL COMPONENTS

(71) Applicant: Lenovo Enterprise Solutions (Singapore) Pte. Ltd., Singapore (SG)

(72) Inventors: Douglas Evans, Cary, NC (US); Brian Christopher Totten, Durham, NC (US); Dipak Tailor, Cary, NC (US); Jamaica Laquay Barnette, Durham, NC (US)

(73) Assignee: Lenovo Enterprise Solutions (Singapore) Pte. Ltd., Singapore (SG)

(*) Notice: Subject to any disclaimer, the term of this patent is extended or adjusted under 35 U.S.C. 154(b) by 100 days.

(21) Appl. No.: 15/968,609

(22) Filed: May 1, 2018

(65) Prior Publication Data
US 2019/0339655 A1 Nov. 7, 2019

(51) Int. Cl.
*G05B 19/042* (2006.01)
*G05F 1/625* (2006.01)

(52) U.S. Cl.
CPC ........... *G05B 19/042* (2013.01); *G05F 1/625* (2013.01); *G05B 2219/2639* (2013.01)

(58) Field of Classification Search
None
See application file for complete search history.

(56) References Cited

U.S. PATENT DOCUMENTS

| 6,051,945 A * | 4/2000 | Furukawa | H02H 7/0851 318/264 |
| 2004/0179413 A1* | 9/2004 | Lee | G01R 31/2894 365/201 |

* cited by examiner

*Primary Examiner* — Jas A Sanghera

(57) ABSTRACT

A computer-implemented method for adjusting voltage settings, according to one embodiment, includes: determining a number of components electrically coupled to an output of a voltage regulator; determining voltage tolerance information corresponding to each of the number of components; determining a voltage tolerance limit of the voltage regulator; using the determined voltage tolerance information in combination with the voltage tolerance limit of the voltage regulator to determine whether an output voltage of the voltage regulator can be reduced; calculating an amount by which to reduce an output voltage of the voltage regulator in response to determining that the output voltage of the voltage regulator can be reduced; and sending one or more instructions to the voltage regulator to reduce the output voltage of the voltage regulator by the calculated amount.

20 Claims, 7 Drawing Sheets

ADJUSTING VOLTAGE SETTINGS BASED ON ELECTRICAL COMPONENTS

FIELD OF THE INVENTION

The present invention relates to operating voltage regulation, and more particularly, this invention relates to adjusting voltage settings based on system inventory data.

BACKGROUND

A power supply is an electrical device that supplies electric power to an electrical load by converting electric current from a source to the correct voltage, current, and frequency to power the load. Moreover, a voltage regulator is an electronic circuit that provides a stable direct current (DC) voltage independent of the load current, temperature and AC line voltage variations. Accordingly, power supplies and voltage regulators are used to provide a desired operating voltage to the various electrical components included in a given system (e.g., such as a server).

However, the voltage output provided by power supplies and voltage regulators for a server are often designed to meet the voltage tolerance limits of all supported options. Due to the number of resistive elements in the server (e.g., such as connectors, cables, field effect transistors (FETs), fuses, etc.) the power supply and/or voltage regulator output voltage is often increased in conventional products to compensate for the voltage drops associated with the various resistive elements, and ensure minimum voltage limits are met for all options supported in that system. While this scheme is usually able to compensate for the voltage drops, increasing the power supply and/or voltage regulator output voltage negatively impacts the efficiency of the server. For instance, increasing the output voltage of the power supply causes increased switching losses on downstream voltage regulators, while increasing the output voltage of the voltage regulator(s) increases the power consumption of the load. Moreover, this reduction in efficiency is unnecessarily applied to conventional systems that are populated with options that have wider voltage tolerance limits.

SUMMARY

A computer-implemented method for adjusting voltage settings, according to one embodiment, includes: determining a number of components electrically coupled to an output of a voltage regulator; determining voltage tolerance information corresponding to each of the number of components; determining a voltage tolerance limit of the voltage regulator; using the determined voltage tolerance information in combination with the voltage tolerance limit of the voltage regulator to determine whether an output voltage of the voltage regulator can be reduced; calculating an amount by which to reduce an output voltage of the voltage regulator in response to determining that the output voltage of the voltage regulator can be reduced; and sending one or more instructions to the voltage regulator to reduce the output voltage of the voltage regulator by the calculated amount.

A computer program product for adjusting voltage settings, according to another embodiment, includes a non-transitory computer readable storage medium. The computer readable storage medium includes program code stored thereon. Moreover, the program code is executable by a computer to cause the computer to perform a process which includes: determining, by the computer, a number of components electrically coupled to an output of a voltage regulator; determining, by the computer, voltage tolerance information corresponding to each of the number of components; determining, by the computer, a voltage tolerance limit of the voltage regulator; using, by the computer, the determined voltage tolerance information in combination with the voltage tolerance limit of the voltage regulator to determine whether an output voltage of the voltage regulator can be reduced; calculating, by the computer, an amount by which to reduce an output voltage of the voltage regulator in response to determining that the output voltage of the voltage regulator can be reduced; and sending, by the computer, one or more instructions to the voltage regulator to reduce the output voltage of the voltage regulator by the calculated amount.

A system, according to yet another embodiment, includes: a voltage regulator; one or more components electrically coupled to an output of the voltage regulator; a processor in communication with the voltage regulator; and logic executable by the processor. Moreover, the logic is configured to: determine, by the processor, a number of components electrically coupled to an output of a voltage regulator; determine, by the processor, voltage tolerance information corresponding to each of the number of components; determine, by the processor, a voltage tolerance limit of the voltage regulator; use, by the processor, the determined voltage tolerance information in combination with the voltage tolerance limit of the voltage regulator to determine whether an output voltage of the voltage regulator can be reduced; calculate, by the processor, an amount by which to reduce an output voltage of the voltage regulator in response to determining that the output voltage of the voltage regulator can be reduced; and send, by the processor, one or more instructions to the voltage regulator to reduce the output voltage of the voltage regulator by the calculated amount.

Other aspects and advantages of the present invention will become apparent from the following detailed description, which, when taken in conjunction with the drawings, illustrate by way of example the principles of the invention.

DETAILED DESCRIPTION

Figure 1:
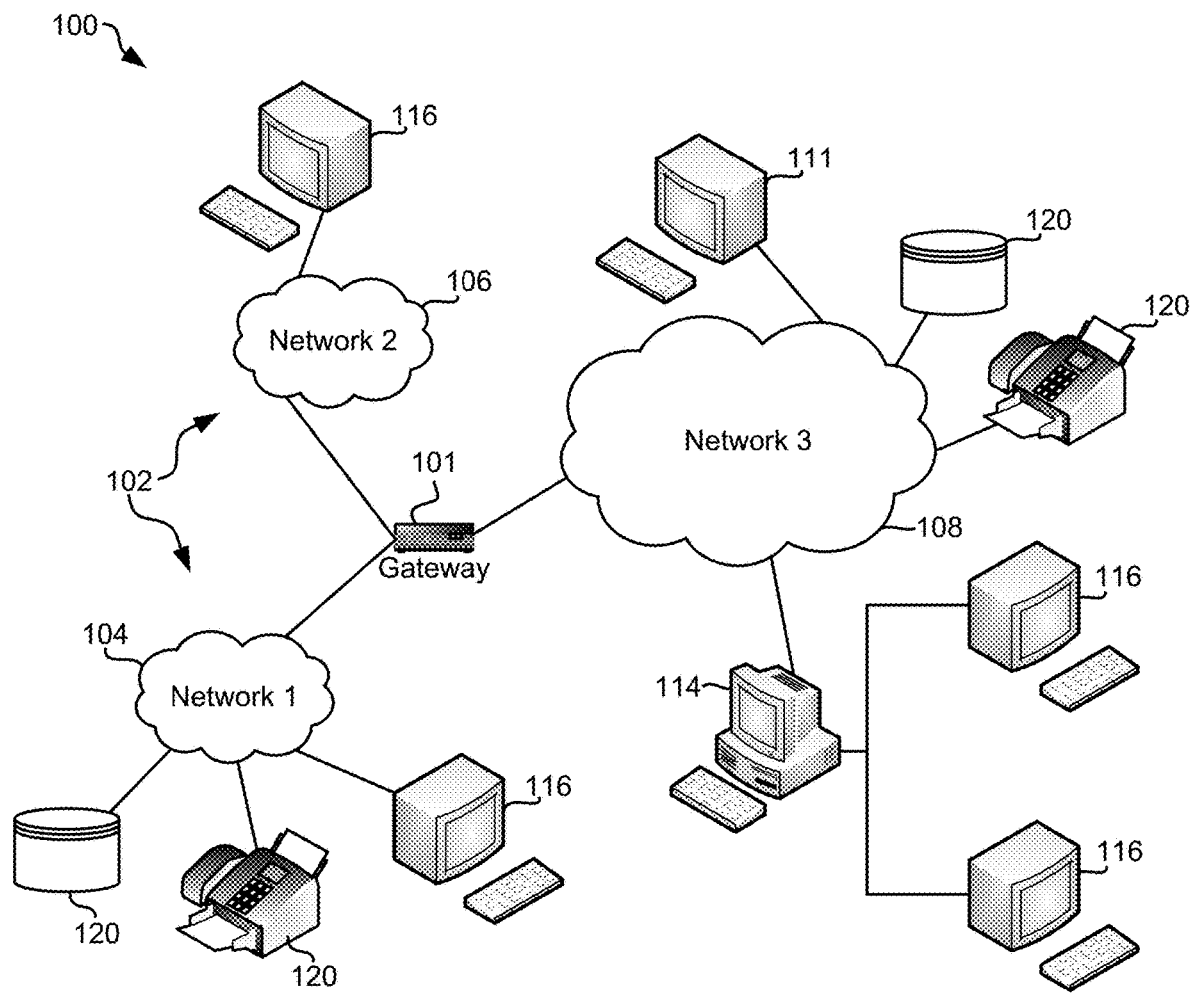
FIG. 1 is a partial representational view of a network architecture in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a", "an", and "the" include plural referents unless otherwise specified.

The following description discloses several preferred embodiments of adjusting voltage settings based on electrical components and/or related systems and methods. Various ones of the embodiments included herein may be able to achieve significant improvements to the efficiency of system operation, particularly in view of conventional shortcomings. For instance, by developing a more accurate representation of the various electrical components included in a given system, voltage settings of the system may be adjusted accordingly, thereby significantly reducing the amount of resources are consumed by the system during operation. Furthermore, these improvements are achieved without negatively affecting the performance of the system, thereby desirably ensuring accuracy and proficiency of the system as a whole, e.g., as will be described in further detail below.

In one general embodiment, a computer-implemented method for adjusting voltage settings, includes: determining a number of components electrically coupled to an output of a voltage regulator; determining voltage tolerance information corresponding to each of the number of components; determining a voltage tolerance limit of the voltage regulator; using the determined voltage tolerance information in combination with the voltage tolerance limit of the voltage regulator to determine whether an output voltage of the voltage regulator can be reduced; calculating an amount by which to reduce an output voltage of the voltage regulator in response to determining that the output voltage of the voltage regulator can be reduced; and sending one or more instructions to the voltage regulator to reduce the output voltage of the voltage regulator by the calculated amount.

In another general embodiment, a computer program product for adjusting voltage settings, includes a non-transitory computer readable storage medium. The computer readable storage medium includes program code stored thereon. Moreover, the program code is executable by a computer to cause the computer to perform a process which includes: determining, by the computer, a number of components electrically coupled to an output of a voltage regulator; determining, by the computer, voltage tolerance information corresponding to each of the number of components; determining, by the computer, a voltage tolerance limit of the voltage regulator; using, by the computer, the determined voltage tolerance information in combination with the voltage tolerance limit of the voltage regulator to determine whether an output voltage of the voltage regulator can be reduced; calculating, by the computer, an amount by which to reduce an output voltage of the voltage regulator in response to determining that the output voltage of the voltage regulator can be reduced; and sending, by the computer, one or more instructions to the voltage regulator to reduce the output voltage of the voltage regulator by the calculated amount.

In yet another general embodiment, a system includes: a voltage regulator; one or more components electrically coupled to an output of the voltage regulator; a processor in communication with the voltage regulator; and logic executable by the processor. Moreover, the logic is configured to: determine, by the processor, a number of components electrically coupled to an output of a voltage regulator; determine, by the processor, voltage tolerance information corresponding to each of the number of components; determine, by the processor, a voltage tolerance limit of the voltage regulator; use, by the processor, the determined voltage tolerance information in combination with the voltage tolerance limit of the voltage regulator to determine whether an output voltage of the voltage regulator can be reduced; calculate, by the processor, an amount by which to reduce an output voltage of the voltage regulator in response to determining that the output voltage of the voltage regulator can be reduced; and send, by the processor, one or more instructions to the voltage regulator to reduce the output voltage of the voltage regulator by the calculated amount.

The description herein is presented to enable any person skilled in the art to make and use the invention and is provided in the context of particular applications of the invention and their limits. Various modifications to the disclosed embodiments will be readily apparent to those skilled in the art and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

In particular, various embodiments of the invention discussed herein are implemented using the Internet as a means of communicating among a plurality of computer systems. One skilled in the art will recognize that the present invention is not limited to the use of the Internet as a communication medium and that alternative methods of the invention may accommodate the use of a private intranet, a Local Area Network (LAN), a Wide Area Network (WAN) or other means of communication. In addition, various combinations of wired, wireless (e.g., radio frequency) and optical communication links may be utilized.

The program environment in which one embodiment of the invention may be executed illustratively incorporates one or more general-purpose computers or special-purpose devices such hand-held computers. Details of such devices (e.g., processor, memory, data storage, input and output devices) are well known and are omitted for the sake of clarity.

It should also be understood that the techniques of the present invention might be implemented using a variety of technologies. For example, the methods described herein may be implemented in software running on a computer system, or implemented in hardware utilizing one or more processors and logic (hardware and/or software) for performing operations of the method, application specific integrated circuits, programmable logic devices such as Field Programmable Gate Arrays (FPGAs), and/or various combinations thereof. In one illustrative approach, methods described herein may be implemented by a series of computer-executable instructions residing on a storage medium such as a physical (e.g., non-transitory) computer-readable medium. In addition, although specific embodiments of the invention may employ object-oriented software programming concepts, the invention is not so limited and is easily adapted to employ other forms of directing the operation of a computer.

The invention can also be provided in the form of a computer program product comprising a computer readable storage or signal medium having computer code thereon, which may be executed by a computing device (e.g., a processor) and/or system. A computer readable storage medium can include any medium capable of storing computer code thereon for use by a computing device or system, including optical media such as read only and writeable CD and DVD, magnetic memory or medium (e.g., hard disk drive, tape), semiconductor memory (e.g., FLASH memory and other portable memory cards, etc.), firmware encoded in a chip, etc.

A computer readable signal medium is one that does not fit within the aforementioned storage medium class. For example, illustrative computer readable signal media communicate or otherwise transfer transitory signals within a system, between systems e.g., via a physical or virtual network, etc.

FIG. 1 illustrates a network architecture 100, in accordance with one embodiment. As an option, the present network architecture 100 may be implemented in conjunction with features from any other embodiment listed herein, such as those described with reference to the other FIGS. Of course, however, such network architecture 100 and others presented herein may be used in various applications and/or in permutations which may or may not be specifically described in the illustrative embodiments listed herein. Further, the network architecture 100 presented herein may be used in any desired environment.

As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, laptop computer, hand-held computer, printer or any other type of logic. It should be noted that a user device 111 may also be directly coupled to any of the networks, in one embodiment.

A peripheral 120 or series of peripherals 120, e.g. facsimile machines, printers, networked storage units, etc., may be coupled to one or more of the networks 104, 106, 108. It should be noted that databases, servers, and/or additional electrical components may be utilized with, or integrated into, any type of network element coupled to the networks 104, 106, 108. In the context of the present description, a network element may refer to any electrical component of a network.

According to some approaches, methods and systems described herein may be implemented with and/or on virtual systems and/or systems which emulate one or more other systems, such as a UNIX system which emulates a MAC OS environment, a UNIX system which virtually hosts a MICROSOFT WINDOWS environment, a MICROSOFT WINDOWS system which emulates a MAC OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data processing and/or storage, servers, etc., are provided to any system in the cloud, preferably in an on-demand relationship, thereby allowing access and distribution of services across many computing systems. Cloud computing typically involves an Internet or other high speed connection (e.g., 4G LTE, fiber optic, etc.) between the systems operating in the cloud, but other techniques of connecting the systems may also be used.

Figure 2:
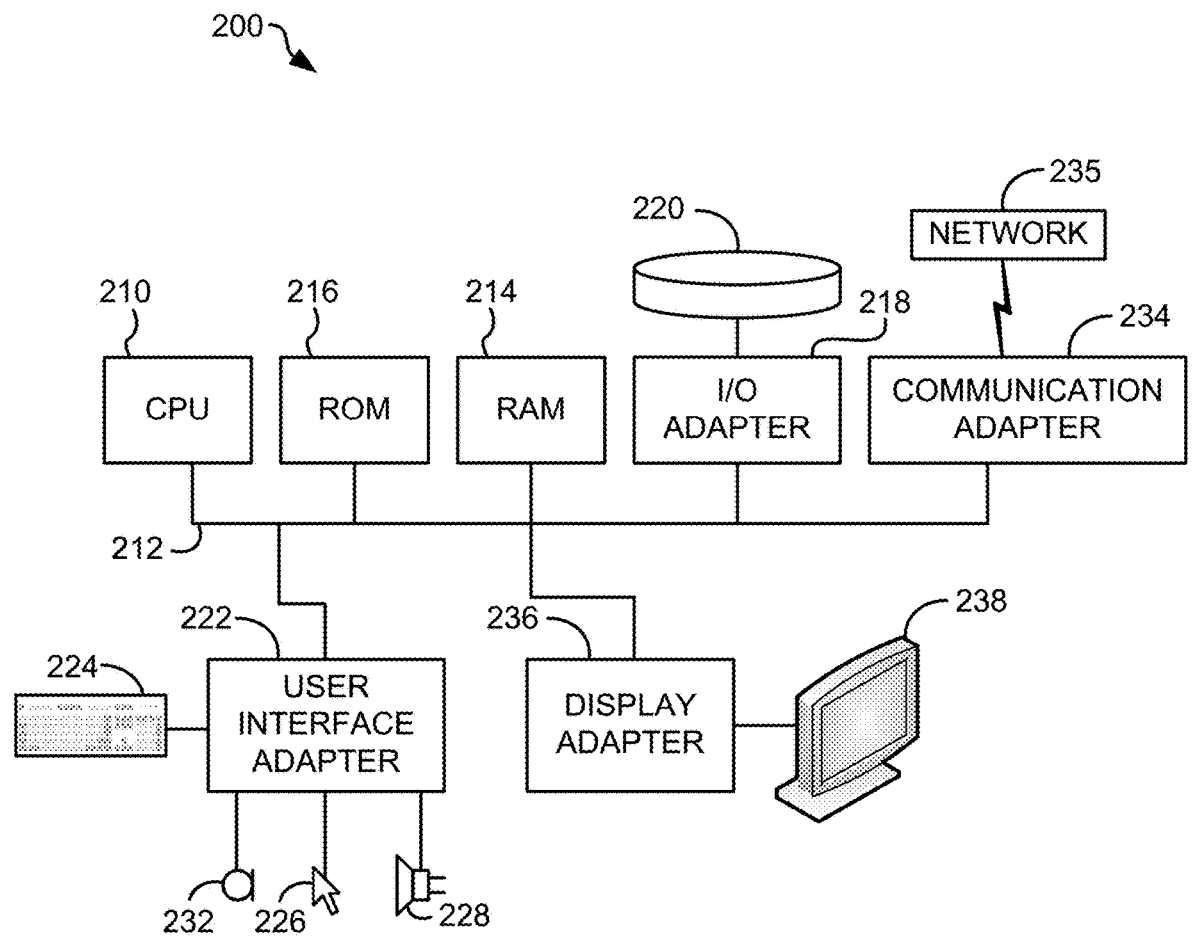
FIG. 2 is a partial representational view of a hardware environment in accordance with one embodiment.

FIG. 2 shows a representative hardware environment 200 associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft WINDOWS Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

As previously mentioned, the voltage output provided (e.g., supplied) by power supplies and voltage regulators for a given server are often designed to meet the voltage tolerance limits of the various options supported by the server. Due to the number of resistive elements included throughout the server (e.g., such as connectors, cables, FETs, fuses, etc.) the power supply and/or voltage regulator output voltage is often increased higher than normal in conventional products to compensate for the voltage drops associated with the various resistive elements, while also ensuring minimum voltage limits are met for the various options supported in that system. While this scheme may be able to compensate for the voltage drops of some systems, increasing the power supply and/or voltage regulator output voltage negatively impacts the efficiency of the server. For instance, increasing the output voltage of the power supply causes increased switching losses on downstream voltage regulators, while increasing the output voltage of the voltage regulator(s) increases the power consumption of the load. As a result, operating resources are squandered in an attempt to maintain operability of the system. Moreover, this reduction in efficiency is undesirably experienced in conventional systems that are populated with options that have wider voltage tolerance limits.

Some conventional products have attempted to address this issue by implementing inverse load lines to the output voltages, which apply a lower voltage at lower loads. However, such attempts only have an effect on a limited percentage of load ranges. Furthermore, inverse load lines are undesirably dependent on factors other than the installed options for the given system. Thus, these attempts also fall short of providing efficient performance.

In sharp contrast to the foregoing limitations experienced in conventional products, various ones of the embodiments described herein are able to improve the efficiency by which systems (e.g., including servers) are able to operate. For example, by developing a more accurate representation of the various electrical components included in a given system, voltage settings of the system may be adjusted accordingly, thereby significantly improving the efficiency by which the system operates, e.g., as will be described in further detail below.

Figure 3A:
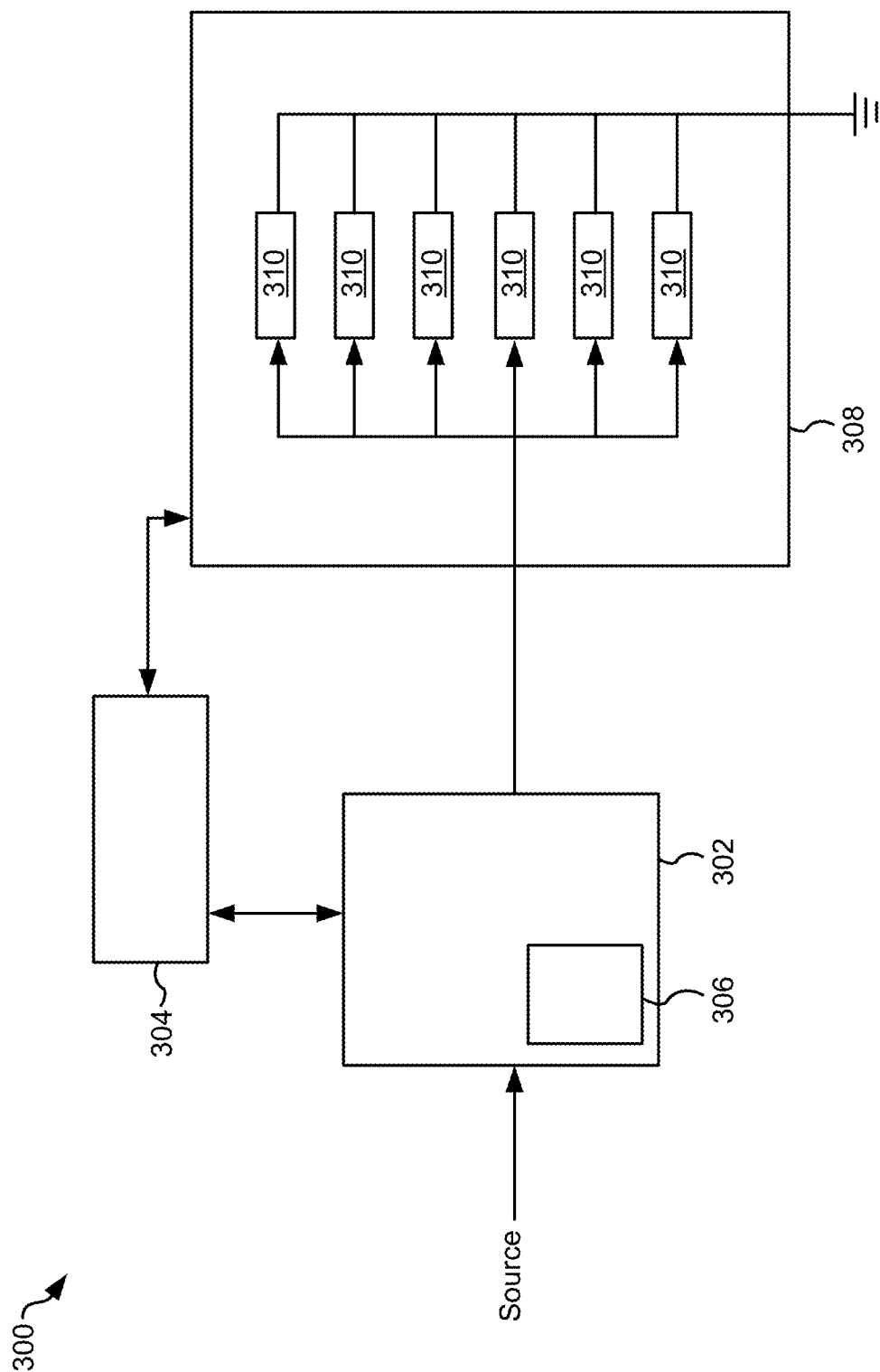
FIG. 3A is a partial representational view of a system in accordance with one embodiment.

Looking to FIG. 3A, a partial schematic view of a system 300 is illustrated in accordance with one embodiment. As an option, the present system 300 may be implemented in conjunction with features from any other embodiment listed herein, such as those described with reference to the other FIGS., such as FIGS. 1-2. However, such system 300 and others presented herein may be used in various applications and/or in permutations which may or may not be specifically described in the illustrative embodiments listed herein. Further, the system 300 presented herein may be used in any desired environment. Thus FIG. 3A (and the other FIGS.) may be deemed to include any possible permutation.

As shown, the system 300 includes a power supply 302 and a controller 304 (e.g., a processor, FPGA, CPU, IC, etc.) electrically coupled thereto. It should be noted that as used herein, components which are "electrically coupled" together may be coupled to each other using a wireless connection, e.g., WiFi, Bluetooth, a cellular network, etc.; a wired connection, e.g., a cable, a fiber-optic link, a wire, etc.; etc., or any other type of connection which would be apparent to one skilled in the art after reading the present description. Accordingly, the connection electrically coupling the power supply 302 and controller 304 together may vary depending on the desired approach. Moreover, components which are electrically coupled together are also preferably in communication with each other. In other words, components which are electrically coupled together are also preferably able to send information to and/or receive information from each other.

The power supply 302 is also electrically coupled to a source which may provide electrical energy in the form of electric current to the power supply 302. The electrical energy provided by the source may originate from an electric power grid (e.g., such as an electrical outlet), energy storage devices (e.g., such as batteries, fuel cells, etc.), generators, alternators, solar power converters, etc., or any other supply of electrical energy. Accordingly, the power supply 302 may be able to use the electrical energy of the source to produce an electrical output having a desired voltage, current, and/or frequency, e.g., using any components and/or processes which would be apparent to one skilled in the art after reading the present description.

The electrical output of the power supply 302 is provided to a system load 308. The system load 308 may include any number of various electrical components 310 which are electrically coupled to the output of the power supply 302. In some approaches, the system 300 may be a server. Accordingly, the electrical components 310 may include electrical server components, e.g., such as connectors, cables, FETs, fuses, etc. Moreover, each of the electrical components 310 may have different performance characteristics (e.g., such as voltage tolerance) associated therewith. Thus, the characteristics of the various electrical components 310 included in the system load 308 may have an effect on the voltage, current, frequency, etc. of the electrical output of the power supply 302, e.g., as will be described in further detail below.

The controller 304 is also electrically coupled to the system load 308 and may thereby be able to determine information (e.g., such as the performance characteristics) corresponding to the various electrical components 310 included in the system load 308. Accordingly, the controller may be able to send one or more instructions to any of the electrical components 310 shown in system 350. In some approaches, the controller 304 may also be able to send information to and/or receive information from a controller (not shown) which manages the various electrical components 310. In other approaches, the controller may send information to and/or receive information from the various electrical components 310 themselves. In still other approaches, the controller 304 may obtain information (e.g., such as the performance characteristics) corresponding to the various electrical components 310 from memory (e.g., a lookup table), product information, specification sheets, a user, overall performance of the system 300, an electrical output of the system load 308, etc.

With continued reference to FIG. 3A, the power supply 302 includes a voltage regulator 306. Accordingly, the power supply 302 may use the voltage regulator 306 to achieve a stable voltage of the electrical output of the power supply 302. The voltage achieved by the voltage regulator 306 may be independent of the load current, temperature, voltage supply variations, etc., thereby providing stable operating conditions for the system load 308 and the electrical components 310 included therein. It follows that the various electrical components 310 in the system load 308 are electrically coupled to the output of the voltage regulator 306. In different approaches, the voltage regulator 306 may be able to achieve a stable output voltage by implementing a feed-forward design and/or negative feedback. Moreover, the voltage regulator 306 may use an electromechanical mechanism and/or electronic elements in order to regulate one or more alternate current (AC) and/or DC voltages, depending on the desired approach.

Although not shown in FIG. 3A, the power supply 302 may include various other components which may be used to achieve the electrical output depending on the approach. For example, the power supply 302 may include one or more transformers, full-wave bridge rectifiers, filter capacitors, resistor load, etc.

Figure 3B:
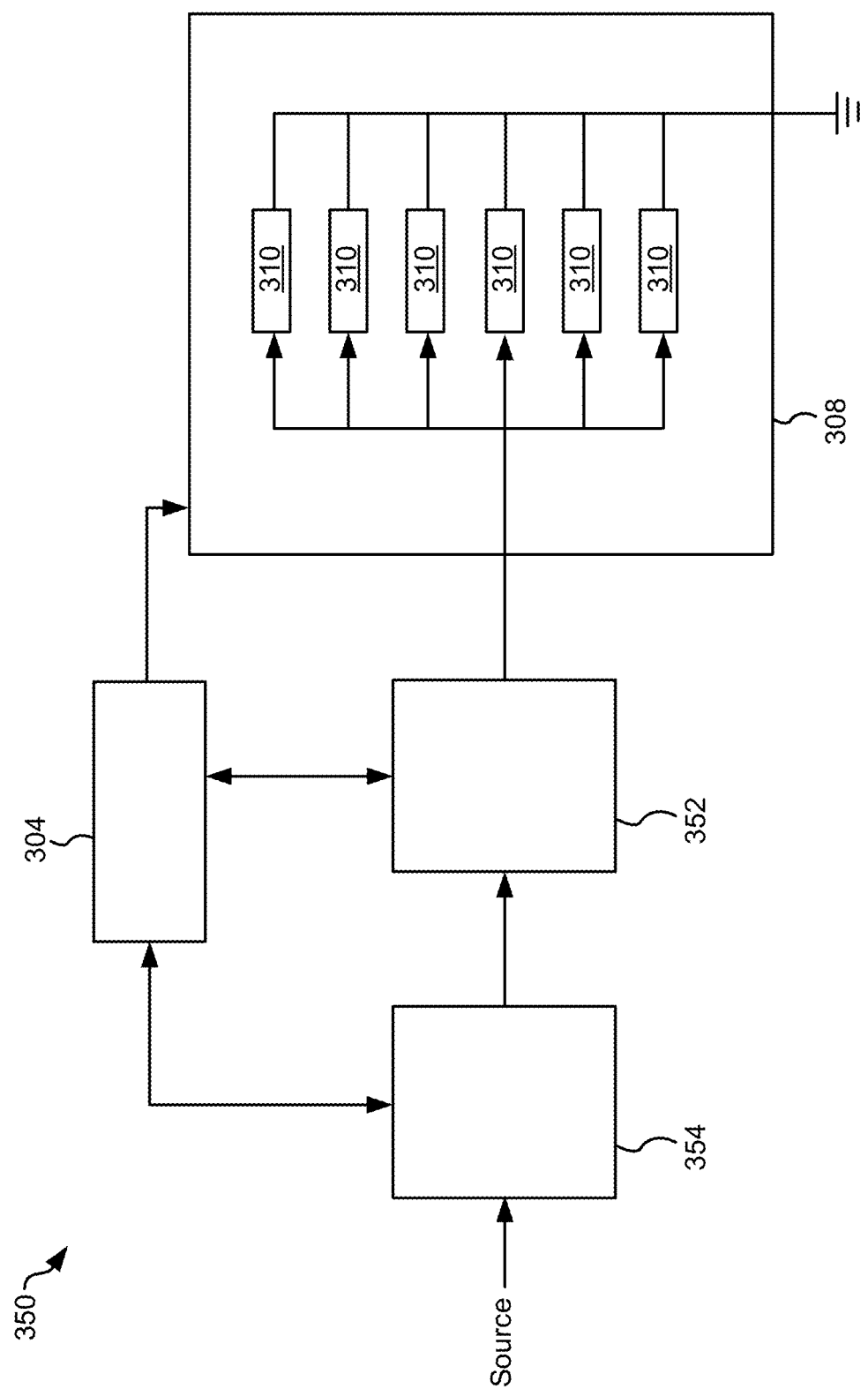
FIG. 3B is a partial representational view of a system in accordance with one embodiment.

It should also be noted that although the power supply 302 is shown as being directly electrically coupled to the system load 308, additional components and/or the arrangement of the components included in system 300 may vary depending on the approach. For instance, looking now to FIG. 3B, a partial schematic view of a system 350 is illustrated in accordance with one embodiment. As an option, the present system 350 may be implemented in conjunction with features from any other embodiment listed herein, such as those described with reference to the other FIGS. Specifically, FIG. 3B illustrate variations of the embodiment of FIG. 3A, depicting an exemplary configurations within the system 350. Accordingly, various components of FIG. 3B have common numbering with those of FIG. 3A.

However, such system 350 and others presented herein may be used in various applications and/or in permutations which may or may not be specifically described in the illustrative embodiments listed herein. Further, the system 350 presented herein may be used in any desired environment. Thus FIG. 3B (and the other FIGS.) may be deemed to include any possible permutation.

As shown, the system 350 includes a voltage regulator 352 which is positioned between the power supply 354 and the system load 308. However, it should be noted that both the voltage regulator 352 and the power supply 354 may include any of the approaches described above. Accordingly, in some approaches the power supply 354 may include another voltage regulator (not shown) in addition to the voltage regulator 352 electrically coupled thereto. In such approaches, the voltage regulator 352 may provide a level of quality control to the electrical output of the power supply 354.

With continued reference to FIG. 3B, the controller 304 is electrically coupled to, and in communication with, the power supply 354, the voltage regulator 352, and the system load 308. Accordingly, the controller 304 may be able to communicate with any of the components shown in system 350, e.g., by sending one or more instructions thereto. In some approaches, the controller 304 may use information (e.g., such as the performance characteristics) corresponding to the various electrical components 310 included in the system load 308 to determine a desirable operating settings of the power supply 354 and/or voltage regulator 352. Similarly, controller 304 may be able to send one or more instructions to any of the components shown in system 300, e.g., such as power supply 302. As mentioned above, the efficiency by which system 300 and/or system 350 is able to operate may be improved by selectively adjusting the voltage settings based on the components included therein. For example, by developing a more accurate representation of the various electrical components included in a given system, unnecessarily high voltage settings of the system may be avoided, thereby significantly improving the efficiency by which the system operates.

Figure 4:
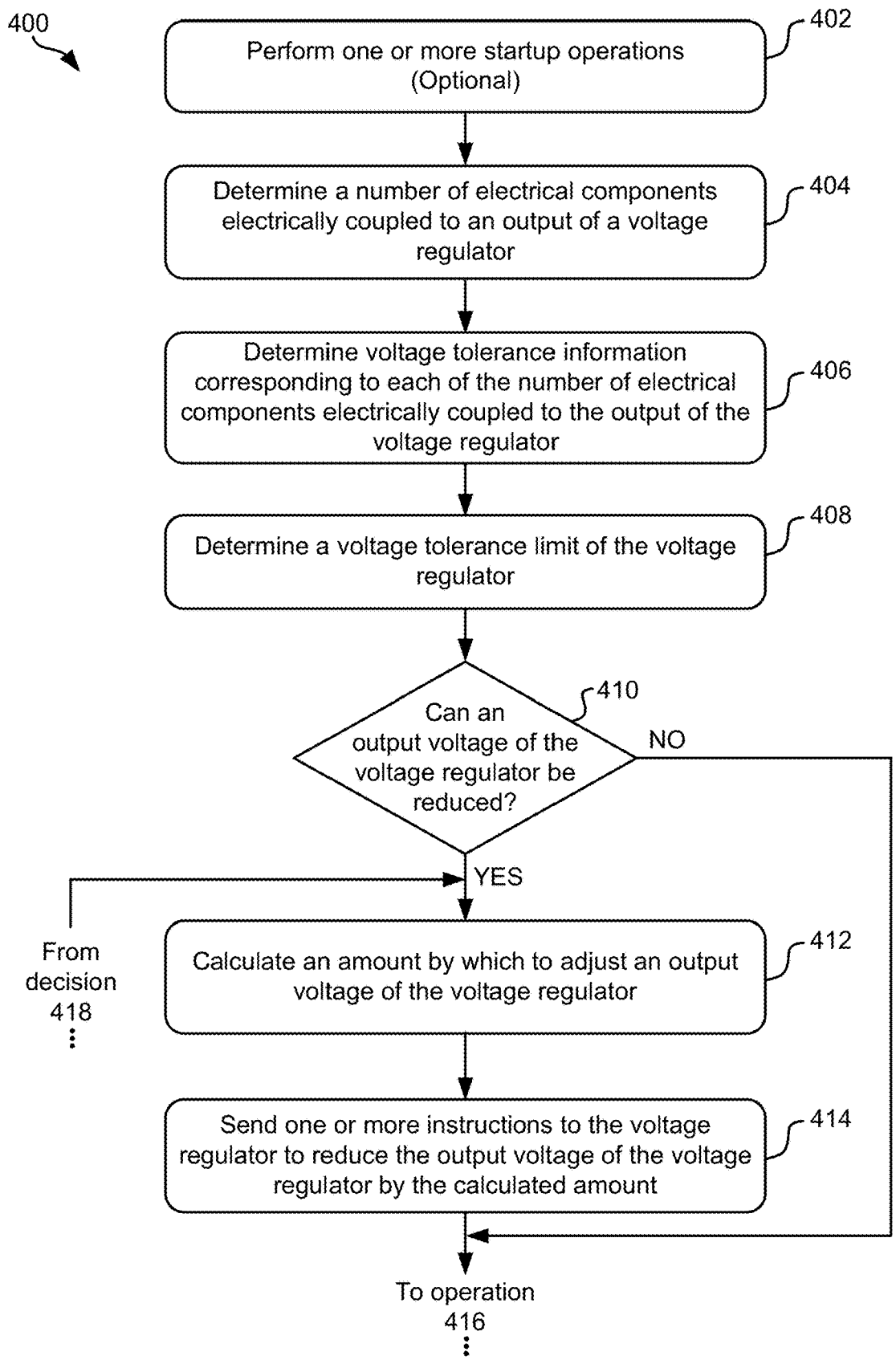
FIG. 4 is a flowchart of a method in accordance with one embodiment.
Figure 4:
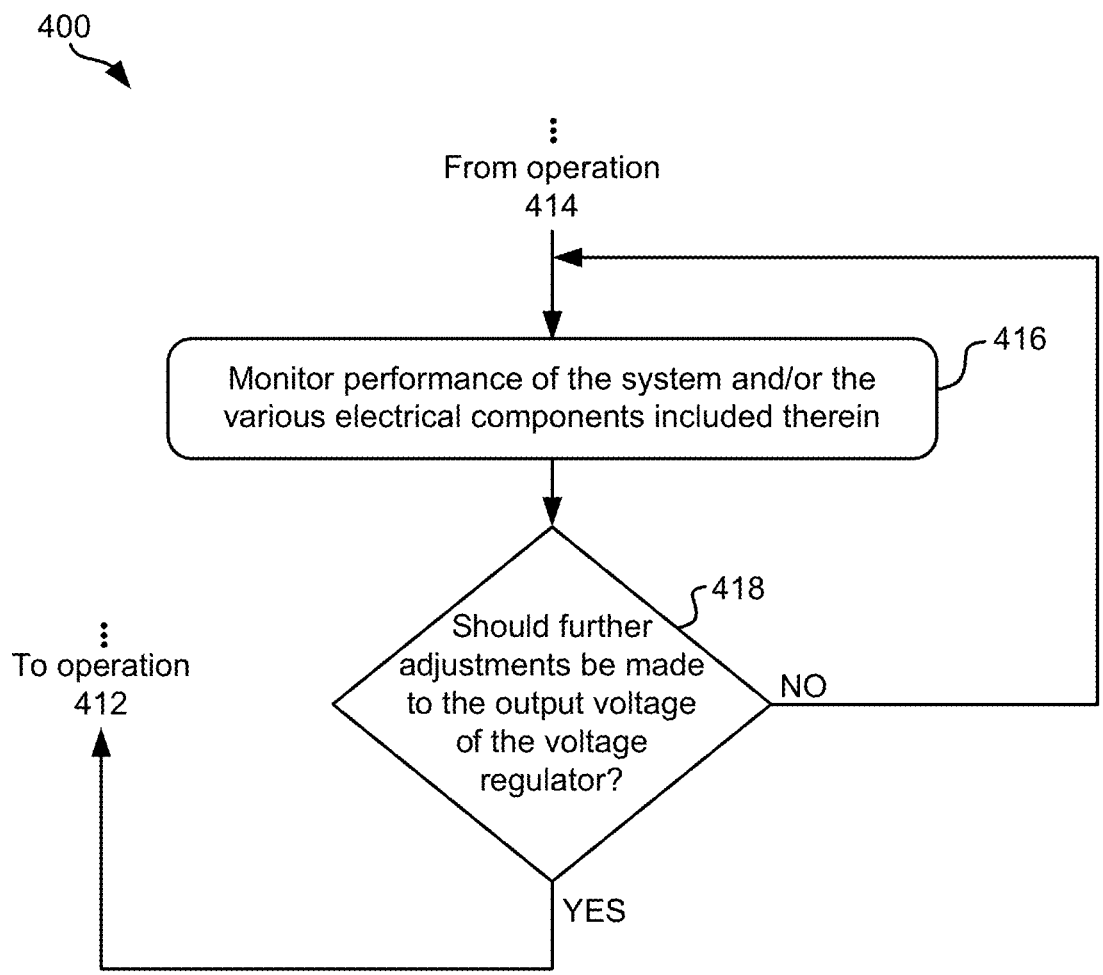

Looking now to FIG. 4, a method 400 for adjusting voltage settings of a system is illustrated according to one embodiment. The method 400 may be performed in accordance with the present invention in any of the environments depicted in FIGS. 1-3B, among others, in various embodiments. Of course, more or less operations than those specifically described in FIG. 4 may be included in method 400, as would be understood by one of skill in the art upon reading the present descriptions.

Each of the processes included in method 400 may be performed by any suitable component of the operating environment. For example, in various embodiments, the method 400 may be partially or entirely performed by a controller (e.g., see 304 of FIGS. 3A-3B), or some other device having one or more processors therein. The processor, e.g., processing circuit(s), chip(s), and/or module(s) implemented in hardware and/or software, and preferably having at least one hardware component may be utilized in any device to perform one or more processes included in method 400. Illustrative processors include, but are not limited to, a CPU, an application specific integrated circuit (ASIC), a field programmable gate array (FPGA), etc., combinations thereof, or any other suitable computing device known in the art. Thus, in some approaches, method 400 may be a computer-implemented method. In such approaches, the computer used to implement the method 400 may include a controller. It should be noted that the terms computer, processor and controller may be used interchangeably with regards to any of the approaches included herein, such components being considered equivalents in the many various permutations of the present invention.

As shown in FIG. 4, method 400 includes performing one or more startup operations in response to receiving a supply voltage (e.g., being turned on). See optional operation 402. It follows that the various processes included in method 400 may be performed in response to the system being powered on (e.g., activated) from a powered off state. However, various ones of the processes included in method 400 may be performed in response to the system being activated from a sleep state, an idol state, etc., depending on the approach. It should also be noted that any one or more of the processes included in method 400 may be performed during normal operation of a system. Accordingly, any one or more of the processes included in method 400 may be performed (e.g., repeated) in response to receiving a request from a user, in response to an electrical component being added to and/or removed from a system load, in response to the options supported by a system being changed, in response to a predetermined amount of time elapsing since one or more of the processes included in method 400 were previously performed, etc. Accordingly, operation 402 has been represented as being optional.

Referring still to FIG. 4, method 400 includes determining a number of electrical components electrically coupled to an output of a voltage regulator. See operation 404. Depending on the particular approach, various electrical components may be electrically coupled to the output of a voltage regulator. In some approaches, the voltage regulator may be included in a system, such as a server. Accordingly, the voltage regulator may be electrically coupled to various electrical server components, e.g., such as connectors, cables, FETs, fuses, etc. For instance, referring momentarily back to FIGS. 3A-3B, electrical components 310 of system load 308 are illustrated as being electrically coupled to the output of voltage regulators 306, 352 respectively.

Moreover, each of the electrical components may have different performance characteristics (e.g., such as voltage tolerance) associated therewith. Thus, the performance characteristics of the various electrical components included in the system may be used to determine desirable settings of the voltage regulator, preferably in order to improve the efficiency of the system as a whole. According to one approach, the voltage tolerance information corresponding to each of the electrical components may be used to adjust the performance settings of the voltage regulator, e.g., as will soon become apparent.

Referring again to FIG. 4, operation 406 includes determining voltage tolerance information corresponding to each of the number of electrical components electrically coupled to the output of the voltage regulator. As alluded to above, a controller implementing one or more of the various processes included in method 400 may be able to send information to and/or receive information from a controller which manages the various electrical components, the various electrical components themselves, etc. Accordingly, in some approaches, determining voltage tolerance information corresponding to each of the number of electrical components may be performed by sending a request to each of the electrical components and/or a managing controller for the voltage tolerance information corresponding to each of the electrical components electrically coupled to the output of the voltage regulator.

In other approaches, the voltage tolerance information corresponding to each of the number of electrical components may be determined by sending one or more instructions to query each of the number of components. The one or more instructions may be sent to a controller which manages the various electrical components. Moreover, voltage tolerance information corresponding to each of the queried number of components may be received in response to sending the one or more instructions.

In still other approaches operation 406 may include obtaining performance characteristic information (e.g., such as voltage tolerance information) corresponding to each of the various electrical components electrically coupled to the output of the voltage regulator from memory (e.g., a lookup table), product information, specification sheets, a user, overall performance of the system, an electrical output of the system load, etc., and/or combinations thereof. Moreover, it should be noted that the approaches for which performing operation 406 includes obtaining performance characteristic information corresponding to each of the various electrical components electrically coupled to the output of the voltage regulator from memory, the memory may be coupled to and/or located in a FPGA of the system, e.g., as would be appreciated by one skilled in the art after reading the present description.

It follows that in some approaches, voltage tolerance information corresponding to certain electrical components and/or supported options may be stored in system memory. According to an illustrative approach, voltage tolerance information corresponding to components and/or supported options implemented in a server may be stored in a FPGA and/or other programmable device included in the server. This may be particularly desirable in instances where the voltage tolerance information may not be determined by querying the components and/or options. Moreover, specific voltage tolerance information which correspond to a specific user, a certain system setting, performance optimization, etc., may be stored in memory and accessed accordingly, e.g., as would be appreciated by one skilled in the art after reading the present description.

Moreover, operation 408 includes determining a voltage tolerance limit of the voltage regulator. Although a voltage regulator may be able to produce an electrical output having a desired voltage, the voltage regulator may have a voltage tolerance limit which introduces a margin of error. According to an example, which is in no way intended to limit the invention, a voltage regulator may have a ±2% voltage tolerance limit. Accordingly, the voltage regulator may be able to produce an electrical output with a voltage that is ±2% of the intended voltage, e.g., as would be appreciated by one skilled in the art after reading the present description. It follows that the voltage tolerance limit of the voltage regulator is preferably also taken into consideration when adjusting voltage settings of a system.

The voltage tolerance limit may be determined in some approaches by sending a request to the voltage regulator itself. However, in other approaches, determining the voltage tolerance limit may include obtaining performance characteristic information corresponding to the voltage regulator from memory (e.g., a lookup table), product information, specification sheets, a user, overall performance of the system, an electrical output of the system load, etc., and/or combinations thereof.

Referring still to FIG. 4, method 400 includes determining whether an output voltage of the voltage regulator can be reduced. See decision 410. In other words, while electrical components are designed to operate using a certain supply voltage, the electrical components may actually be able to successfully and effectively operate using a supply voltage which is lower than designed. This difference between a minimum operating voltage for a given electrical component, and the intended operating voltage of the electrical component, represents the voltage tolerance of the electrical component. Moreover, this voltage tolerance may be represented as a percentage of the intended operating voltage. For example, an electrical component having an intended operating voltage of 10 Volts (V) and a voltage tolerance of ±10% may actually be able to successfully and effectively operate in response to receiving a supply voltage of between 9V and 11V.

However, the voltage tolerance limit of the voltage regulator is again preferably taken into account. As mentioned above, a voltage regulator may be able to produce an electrical output having a desired voltage with a voltage tolerance limit (e.g., margin of error). Thus, the output voltage of the voltage regulator is preferably not reduced to a value which may be lower than the voltage tolerance of an electrical component in view of the margin of error of the voltage regulator. Using the same example as above, an electrical component having an intended operating voltage of 10V and a voltage tolerance of ±10% may actually be able to successfully and effectively operate in response to receiving a supply voltage of between 9V and 11V. Thus, an "ideal" voltage regulator having a 0% voltage tolerance limit (i.e., no margin of error) may be adjusted to provide an output voltage of 9V rather than 10V, thereby maximizing the amount of power saved while also ensuring successful operation of the electrical component. However, the output of a voltage regulator having a ±2% voltage tolerance limit is preferably not lowered to 9V. Although the output of a voltage regulator may be set to 9V, the 2% voltage tolerance limit may cause the voltage regulator output to drop to [9V−9V×(2%)]=8.82V at least in some situations. As a result, the output voltage of the voltage regulator will be lower than the minimum supply voltage of the electrical component, thereby causing performance issues for the electrical component as well as the system as a whole. It follows that the voltage tolerance limit of the voltage regulator is preferably also taken into consideration when performing decision 410.

Accordingly, the process of determining whether an output voltage of the voltage regulator can be reduced may include determining a component of the number of components having a having a highest resulting minimum operating voltage. For approaches which include more than one electrical component, each of which having a different voltage tolerance corresponding thereto, the electrical component having the highest resulting minimum operating voltage preferably controls. In other words, the electrical component having the highest minimum operating voltage of all the electrical components in the system is preferably used to calculate the amount by which to reduce an output voltage of the voltage regulator. As a result, all electrical components in the system may be able to operate successfully provided the output voltage. In some approaches, the highest minimum operating voltage may result from an electrical component having a highest intended operating voltage, e.g., in comparison to the minimum operating voltages corresponding to the other electrical components. In other approaches, the highest minimum operating voltage may result from an electrical component having a smallest (e.g., tightest) voltage tolerance, e.g., in comparison to the voltage tolerances corresponding to the other electrical components.

The voltage tolerance of the electrical component having the highest resulting minimum operating voltage may further be compared to the voltage tolerance limit of the voltage regulator. Accordingly, a determination that the output voltage of the voltage regulator can be reduced may be made in response to determining that the voltage tolerance of the electrical component having the highest resulting minimum operating voltage is lower than the voltage tolerance limit of the voltage regulator. According to an illustrative approach, the amount by which the output voltage of the voltage regulator may be reduced can be calculated by determining the difference between the smallest (e.g., tightest) voltage tolerance and the voltage tolerance limit of the voltage regulator.

Referring still to FIG. 4, in response to determining that the output voltage of the voltage regulator cannot be reduced, e.g., at least without negatively effecting performance of the system, method 400 is shown as jumping to operation 416. There, operation 416 includes monitoring performance of the system and/or the various electrical components included therein. Accordingly, the determination of whether the output voltage of the voltage regulator can be adjusted may be performed at a later point in time, e.g., as will be described in further detail below.

Looking again to decision 410, the method 400 proceeds to operation 412 in response to determining that the output voltage of the voltage regulator can be reduced. There, operation 412 includes calculating an amount by which to adjust an output voltage of the voltage regulator. As described above, the amount by which the output voltage of the voltage regulator may be reduced is preferably calculated considering the voltage tolerances of the various electrical components electrically coupled to the output of the voltage regulator, as well as the voltage tolerance limit of the voltage regulator.

As described above, for approaches which include more than one electrical component, each of which having a different voltage tolerance corresponding thereto, the electrical component having the highest resulting minimum operating voltage preferably controls. In other words, the electrical component having the highest minimum operating voltage of all the electrical components in the system is preferably used to calculate the amount by which to reduce an output voltage of the voltage regulator. Thus, according to an illustrative approach, the amount by which the output voltage of the voltage regulator may be reduced may be calculated by determining the difference between the smallest (e.g., tightest) voltage tolerance and the voltage tolerance limit of the voltage regulator.

Furthermore, operation 414 of method 400 includes sending one or more instructions to the voltage regulator to reduce the output voltage of the voltage regulator by the amount calculated in operation 412. Depending on the approach, the one or more instructions sent to the voltage regulator may correspond to specific settings of the voltage regulator, general limitations of the voltage regulator, a processor included in the voltage regulator, etc.

By reducing the output voltage of the voltage regulator based on the voltage tolerances of the specific electrical components electrically coupled to the output of the voltage regulator, the processes included in method 400 are able to reduce the amount of excess voltage produced by the voltage regulator. According to the present description "excess voltage" is intended to refer to the difference between the output voltage of the voltage regulator, and the highest minimum operating voltage of the various electrical components coupled to the voltage regulator. As described above, although the electrical components included in a system perform successfully provided (e.g., supplied with) an intended operating voltage, the voltage tolerance of many electrical components allow them to perform successfully provided an operating voltage which is lower than the intended operating voltage. Thus, by taking advantage of this difference between the intended operating voltage and the minimum operating voltage, systems may be able to reduce power consumption, thereby achieving increased efficiency while also ensuring performance is not negatively affected at all.

Referring still to FIG. 4, operation 416 includes monitoring performance of the system and/or the various electrical components included therein. Over time and with use, certain system settings may change. For instance, electrical components may be added to and/or removed from the system, the system may enter a different state (e.g., a low power mode, a high throughput state, etc.), select electrical components may be activated and/or enter an idle state, etc. Accordingly, the voltage requests of the system may change over time and with use. Moreover, the performance of the system and/or the various electrical components included therein may be monitored using any approaches which would be apparent to one skilled in the art after reading the present description.

Furthermore, decision 418 includes determining whether further adjustments should be made to the output voltage of the voltage regulator. The determination may be made using any of the approaches included herein. For instance, in some approaches decision 418 may include determining whether electrical components have been added to and/or removed from the system, whether system settings have changed, whether user requests have been received, etc., since the amount by which to adjust the output voltage of the voltage regulator was last calculated (e.g., see operation 412 above). Accordingly, in some approaches decision 418 may include performing any of the approaches described above with reference to operation 406 and 408.

In response to determining that further adjustments should be made to the output voltage of the voltage regulator, method 400 returns to operation 412 such that processes 412, 414, 416 and 418 may be repeated. While operations 412 and 414 preferably result in the operating voltage of the voltage regulator being reduced such that efficiency of the system is improved, in certain situations the output voltage of the voltage regulator may be increased. For instance, an electrical component having a minimum operating voltage which is higher than the electrical component having a current highest minimum operating voltage may be added to the system, thereby raising the minimum output voltage of the voltage regulator.

However, looking again to decision 418, method 400 is shown as returning to operation 416 in response to determining that further adjustments should not be made to the output voltage of the voltage regulator. Accordingly, operation 416 may be repeated such that performance of the system and/or the various electrical components included therein is further monitored. Moreover, decision 418 may be re-determined at a later point in time, e.g., based on the further monitoring of the system and/or the various electrical components included therein.

It should be noted that although the flowchart of FIG. 4 includes various ones of the processes being repeated, in other approaches, method 400 may end in response to determining that the output voltage of the voltage regulator should not be adjusted in decision 410 and/or decision 418. However, method 400 may be initiated again as desired. Moreover, although the various processes included in method 400 are directed towards adjusting the voltage output of a voltage regulator, any one of the approaches included herein may additionally or alternatively include adjusting the output of a power supply. For example, looking back to FIG. 3A, the output voltage of the power supply 302 may be adjusted according to any of the approaches included herein. According to another example, looking back to FIG. 3B, the output voltage of the power supply 354 and the output voltage of the voltage regulator 352 may both be adjusted according to any one of the various approaches included herein, e.g., as would be appreciated by one skilled in the art after reading the present description.

According to an in-use example, which is in no way intended to limit the invention, a voltage regulator having a nominal output voltage of 3.3V may be designed to produce an electrical output which meet a ±2% voltage tolerance limit at the output (e.g., I/O connectors) thereof. In other words, the voltage regulator may be designed to ensure that the output voltage produced by the voltage regulator is ±2% of the intended 3.3V. Moreover, the ±2% voltage tolerance limit may actually be based on a tolerance of the voltage regulator itself (e.g., a 1% voltage regulator tolerance), combined with any drops in power (e.g., a 1% drop on power plane). However, the electrical components electrically coupled to the output of the voltage regulator may be a plurality of I/O server cards, each of which may have a voltage tolerance of ±9%. Accordingly, various ones of the approaches included herein may be implemented in order to determine that the voltage regulator settings may be adjusted such that a voltage of the electrical output of the voltage regulator is reduced by a maximum amount of 7% from the nominal output voltage of 3.3V. Accordingly, the voltage of the electrical output of the voltage regulator may be reduced to 3.07V in this case while still meeting the voltage tolerances and minimum operating voltages of the I/O server cards currently installed in the system.

However, the voltage of the electrical output of the voltage regulator may not be reduced by a maximum amount in some approaches. In some approaches the voltage of the electrical output of the voltage regulator may be reduced by an amount which is less than the maximum amount, e.g., to serve as a buffer protecting against system errors caused by momentary drops in voltage. For instance, rather than reducing the voltage of the electrical output of the voltage regulator to 3.07V, the output voltage may only be reduced to 3.18V.

Figure 5:
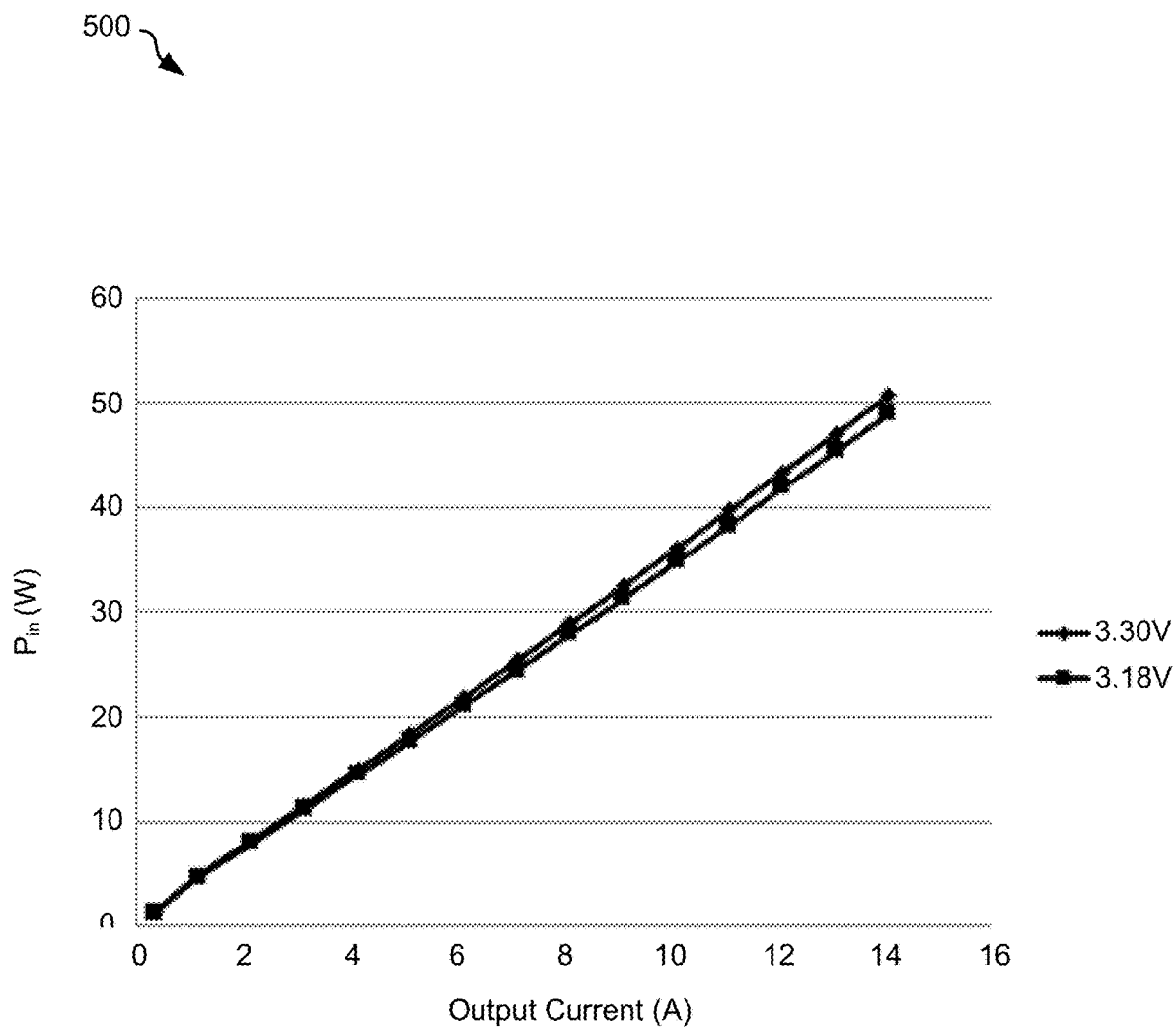
FIG. 5 is a graph of output current with respect to input power for two different output voltages.

Despite only reducing the output voltage of the voltage regulator to 3.18V, the system may experience a substantial savings of between 1 Watt (W) and 1.5 Ws. Looking to FIG. 5, a graph 500 which illustrates output current with respect to input power Pin (measured in watts) is illustrated for the present in-use example. The data illustrated in graph 500 was achieved as a result of experimentation conducted by the inventors. As shown, the potential power savings realized by lowering the output voltage of the voltage regulator from 3.3V to 3.18V varies from between 1 W and 1.5 Ws depending on the output current.

It follows that various ones of the approaches included herein are able to achieve significant improvements to the efficiency of system operation, particularly in view of conventional shortcomings. For instance, by developing a more accurate representation of the various electrical components included in a given system, voltage settings of the system may be adjusted accordingly, thereby significantly reducing the amount of resources are consumed by the system during operation. Furthermore, these improvements are achieved without negatively affecting the performance of the system, thereby desirably ensuring accuracy and proficiency of the system as a whole.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A computer-implemented method for adjusting voltage settings, the computer-implemented method comprising:
   determining a number of components electrically coupled to an output of a voltage regulator;
   determining voltage tolerance information corresponding to each of the number of components;
   determining a voltage tolerance limit of the voltage regulator;
   using the determined voltage tolerance information in combination with the voltage tolerance limit of the voltage regulator to determine whether an output voltage of the voltage regulator can be reduced;
   calculating an amount by which to reduce an output voltage of the voltage regulator in response to determining that the output voltage of the voltage regulator can be reduced; and
   sending one or more instructions to the voltage regulator to reduce the output voltage of the voltage regulator by the calculated amount.

2. The computer-implemented method as recited in claim 1, wherein determining voltage tolerance information corresponding to each of the number of components includes:
   sending one or more instructions to query each of the number of components; and
   receiving voltage tolerance information corresponding to each of the queried number of components.

3. The computer-implemented method as recited in claim 1, wherein determining voltage tolerance information corresponding to each of the number of components includes:

accessing the voltage tolerance information corresponding to each of the queried number of components from memory.

4. The computer-implemented method as recited in claim 3, wherein the memory is coupled to a field-programmable gate array.

5. The computer-implemented method as recited in claim 1, wherein using the determined voltage tolerance information in combination with the voltage tolerance limit of the voltage regulator to determine whether an output voltage of the voltage regulator can be reduced includes:
- determining a component of the number of components having a smallest voltage tolerance;
- comparing the smallest voltage tolerance to the voltage tolerance limit of the voltage regulator; and
- determining that the output voltage of the voltage regulator can be reduced in response to determining that the smallest voltage tolerance is lower than the voltage tolerance limit of the voltage regulator.

6. The computer-implemented method as recited in claim 1, wherein calculating an amount by which to reduce an output voltage of the voltage regulator includes:
- calculating a difference between the smallest voltage tolerance and the voltage tolerance limit of the voltage regulator, wherein the difference is the calculated amount by which to reduce an output voltage of the voltage regulator.

7. The computer-implemented method as recited in claim 1, wherein each of the operations is performed by a computer coupled to, and in communication with, the voltage regulator.

8. A computer program product for adjusting voltage settings, the computer program product comprising a non-transitory computer readable storage medium, the computer readable storage medium having program code stored thereon, the program code executable by a computer to cause the computer to perform a process comprising:
- determining, by the computer, a number of components electrically coupled to an output of a voltage regulator;
- determining, by the computer, voltage tolerance information corresponding to each of the number of components;
- determining, by the computer, a voltage tolerance limit of the voltage regulator;
- using, by the computer, the determined voltage tolerance information in combination with the voltage tolerance limit of the voltage regulator to determine whether an output voltage of the voltage regulator can be reduced;
- calculating, by the computer, an amount by which to reduce an output voltage of the voltage regulator in response to determining that the output voltage of the voltage regulator can be reduced; and
- sending, by the computer, one or more instructions to the voltage regulator to reduce the output voltage of the voltage regulator by the calculated amount.

9. The computer program product as recited in claim 8, wherein determining voltage tolerance information corresponding to each of the number of components includes:
- sending one or more instructions to query each of the number of components; and
- receiving voltage tolerance information corresponding to each of the queried number of components.

10. The computer program product as recited in claim 8, wherein determining voltage tolerance information corresponding to each of the number of components includes:
- accessing the voltage tolerance information corresponding to each of the number of components from memory.

11. The computer program product as recited in claim 10, wherein the memory is coupled to a field-programmable gate array.

12. The computer program product as recited in claim 8, wherein using the determined voltage tolerance information in combination with the voltage tolerance limit of the voltage regulator to determine whether an output voltage of the voltage regulator can be reduced includes:
- determining a component of the number of components having a smallest voltage tolerance;
- comparing the smallest voltage tolerance to the voltage tolerance limit of the voltage regulator; and
- determining that the output voltage of the voltage regulator can be reduced in response to determining that the smallest voltage tolerance is lower than the voltage tolerance limit of the voltage regulator.

13. The computer program product as recited in claim 8, wherein calculating an amount by which to reduce an output voltage of the voltage regulator includes:
- calculating a difference between the smallest voltage tolerance and the voltage tolerance limit of the voltage regulator, wherein the difference is the calculated amount by which to reduce an output voltage of the voltage regulator.

14. The computer program product as recited in claim 8, wherein a processor is coupled to, and in communication with, the voltage regulator.

15. A system, comprising:
- a voltage regulator;
- one or more components electrically coupled to an output of the voltage regulator;
- a processor in communication with the voltage regulator; and
- logic executable by the processor, the logic being configured to:
  - determine, by the processor, a number of components electrically coupled to an output of a voltage regulator;
  - determine, by the processor, voltage tolerance information corresponding to each of the number of components;
  - determine, by the processor, a voltage tolerance limit of the voltage regulator;
  - use, by the processor, the determined voltage tolerance information in combination with the voltage tolerance limit of the voltage regulator to determine whether an output voltage of the voltage regulator can be reduced;
  - calculate, by the processor, an amount by which to reduce an output voltage of the voltage regulator in response to determining that the output voltage of the voltage regulator can be reduced; and
  - send, by the processor, one or more instructions to the voltage regulator to reduce the output voltage of the voltage regulator by the calculated amount.

16. The system as recited in claim 15, wherein determining voltage tolerance information corresponding to each of the number of components includes:
- sending one or more instructions to query each of the number of components; and
- receiving voltage tolerance information corresponding to each of the queried number of components.

17. The system as recited in claim 15, wherein determining voltage tolerance information corresponding to each of the number of components includes:
- accessing the voltage tolerance information corresponding to each of the number of components from memory.

18. The system as recited in claim 17, wherein the memory is located in a field-programmable gate array.

19. The system as recited in claim 15, wherein using the determined voltage tolerance information in combination with the voltage tolerance limit of the voltage regulator to determine whether an output voltage of the voltage regulator can be reduced includes:
- determining a component of the number of components having a smallest voltage tolerance;
- comparing the smallest voltage tolerance to the voltage tolerance limit of the voltage regulator; and
- determining that the output voltage of the voltage regulator can be reduced in response to determining that the smallest voltage tolerance is lower than the voltage tolerance limit of the voltage regulator.

20. The system as recited in claim 15, wherein calculating an amount by which to reduce an output voltage of the voltage regulator includes:
- calculating a difference between the smallest voltage tolerance and the voltage tolerance limit of the voltage regulator, wherein the difference is the calculated amount by which to reduce an output voltage of the voltage regulator.

\* \* \* \* \*